United States Patent
Tanno (10) Patent No.: US 7,677,286 B2
(45) Date of Patent: Mar. 16, 2010

(54) TIRE/WHEEL ASSEMBLY AND RUN-FLAT CORE

(75) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 720 days.

(21) Appl. No.: 10/594,168

(22) PCT Filed: Apr. 13, 2005

(86) PCT No.: PCT/JP2005/007127

§ 371 (c)(1),
(2), (4) Date: Sep. 26, 2006

(87) PCT Pub. No.: WO2005/100051

PCT Pub. Date: Oct. 27, 2005

(65) Prior Publication Data

US 2007/0199636 A1    Aug. 30, 2007

(30) Foreign Application Priority Data

Apr. 14, 2004  (JP) .............................. 2004-118752

(51) Int. Cl.
*B60C 17/00*  (2006.01)
*B60C 17/04*  (2006.01)

(52) U.S. Cl. ..................... 152/516; 152/152; 152/520

(58) Field of Classification Search ............... 152/516, 152/152, 520

See application file for complete search history.

(56) References Cited

U.S. PATENT DOCUMENTS 6,581,658 B2 *  6/2003  Nakajima et al. ........ 152/154.1
2002/0104600 A1  8/2002  Flament et al.

FOREIGN PATENT DOCUMENTS

| ES | 2030328 | * | 10/1992 |
|----|---------|---|---------|
| JP | 64-078902 |   | 3/1989  |
| JP | 2003-510209 |   | 3/2003  |
| JP | 2004-026130 |   | 1/2004  |
| JP | 2004-51012 | * | 2/2004  |
| JP | 2004-90753 | * | 3/2004  |
| JP | 2004-148978 |   | 5/2004  |
| JP | 2004-262271 |   | 9/2004  |

* cited by examiner

*Primary Examiner*—Justin Fischer
(74) *Attorney, Agent, or Firm*—Greer, Burns & Crain, Ltd.

(57) ABSTRACT

The present invention provides a tire/wheel assembly and a run-flat core, which enable reduction of a cavity resonance generated in a case where the run-flat core is inserted into a cavity formed between the pneumatic tire and a rim of a wheel. In the tire/wheel assembly of the present invention, the run-flat core is inserted into a cavity formed between the pneumatic tire and the rim of the wheel, the run-flat core includes a pair of elastic rings which are disposed on the rim respectively along bead portions of the pneumatic tire, and a circular shell which stretches between the elastic rings and extends in the tire circumferential direction. A sound absorbing member is provided to the circular shell.

10 Claims, 8 Drawing Sheets

TIRE/WHEEL ASSEMBLY AND RUN-FLAT CORE

TECHNICAL FIELD

The present invention relates to a tire/wheel assembly, which enables run-flat traveling, and a run-flat core, which is used for the tire/wheel assembly. More specifically, the present invention relates to a tire/wheel assembly and a run-flat core, which are configured so as to reduce cavity resonance generated in a case where the run-flat core is inserted into a cavity formed between the pneumatic tire and a rim of the wheel.

BACKGROUND ART

A large number of techniques for enabling a vehicle to travel in emergency, where a pneumatic tire is punctured while a vehicle is moving, are proposed because of market demands. In some techniques, a core is inserted into a cavity formed between a pneumatic tire and a rim of a wheel. When the pneumatic tire is punctured, the punctured tire is supported by this core. Thereby, run-flat traveling is enabled (For example, refer to Patent Documents 1 and 2).

The run-flat core is configured of a pair of elastic rings, which are disposed on a rim along the respective bead portions of the pneumatic tire, and a circular shell which stretches between the elastic rings, and which extends in the tire circumferential direction. The run-flat core can be used as it is without adding special modifications to an existing wheel, an existing rim and the like, and thus has an advantage that the run-flat core can be accepted in the market with no confusion.

However, when a run-flat core including a circular shell is inserted into a cavity formed between a pneumatic tire and a rim of a wheel, cavity resonance tends to be increased. For this reason, it has been hoped that cavity resonance resulting from the run-flat core is suppressed, and that advantages of the run-flat core are fully utilized.

Patent Document 1: Japanese patent application Kokai publication No. Hei 10-297226

Patent Document 2: Published Japanese translation of international publication for patent application No. 2001-519279

DISCLOSURE OF THE INVENTION

An object of the invention is to provide a tire/wheel assembly and a run-flat core, which enable reduction of a cavity resonance generated in a case where the run-flat core is inserted into a cavity formed between the pneumatic tire and a rim of the wheel.

In the tire/wheel assembly of the present invention for achieving the object described above, a run-flat core is inserted into a cavity formed between a pneumatic tire and a rim of a wheel. The run-flat core is configured of a pair of elastic rings which are disposed on the rim along the respective bead portions of the pneumatic tire, and a circular shell which stretches between the elastic rings and extends in the tire circumferential direction. The tire/wheel assembly is characterized in that a sound absorbing member is provided to the circular shell.

In addition, the run-flat core of the present invention for achieving the object described above is inserted into a cavity formed between a pneumatic tire and a rim of a wheel. The run-flat core is characterized by being configured of a pair of elastic rings which are disposed on the rim along the respective bead portions of the pneumatic tire, and a circular shell which stretches between the elastic rings and extends in the tire circumferential direction. The run-flat core is also characterized in that a sound absorbing member is provided to the circular shell.

In the present invention, the run-flat core is formed to have the outside diameter smaller than the inner diameter of a tread portion of the pneumatic tire so that the run-flat core has a predetermined distance between the run-flat core and the pneumatic tire. In addition, the run-flat core is formed to have the inside diameter with a size substantially equal to that of the bead portion of the pneumatic tire. In a state of being housed in the pneumatic tire, the run-flat core together with the pneumatic tire is integrated to the rim of the wheel, thereby constituting the tire/wheel assembly. When the pneumatic tire is punctured while a vehicle is traveling after the tire/wheel assembly is installed in the vehicle, the punctured and underinflated tire is in the state of being supported by the circular shell of the run-flat core. This enables run-flat traveling.

By providing the sound absorbing member to the circular shell of the run-flat core, the present invention makes it possible to reduce cavity resonance generated in a case where the run-flat core is inserted into the cavity formed between the pneumatic tire and the rim of the wheel.

As the sound absorbing member, a porous member having a tear strength (JIS K6301) of not less than 4.5 N/cm and a sound absorption coefficient (JIS A1405) of not less than 5% at 200 Hz is preferably used. The use of such a porous member imparts a buffer function to the sound absorbing member, and thus improving durability during run-flat traveling. As such a sound absorbing member, polyurethane foam, for instance, can be used.

When the sound absorbing member is provided to the circular shell, it is preferable that a band, to which the sound absorbing member is attached, be wound around the circular shell, and thus the band is clamped to the circular shell. The configuration allows processing costs to be lower than costs entailed in a case of directly attaching the sound absorbing member to the circular shell having a complicated shape. In addition, the band including the sound absorbing member is flexibly applied to circular shells each with a different size.

The sound absorbing member is preferably impregnated with a lubricant. The lubricant exudes from the absorbing member during run-flat driving, and thus reduces friction between the run-flat core and the sound absorbing member or friction between the sound absorbing member and the tire, thereby increasing durability during run-flat traveling.

As to the run-flat core, it is preferable that the sound absorbing member provided to the circular shell be covered with a film so that the sound absorbing member is in a state of having a reduced volume, and then that the film be removed after the run-flat core is housed in the pneumatic tire. Specifically, in order to integrate the run-flat core with the tire/wheel assembly, the run-flat core needs to be housed in the tire once before being integrated with the rim. For this reason, it is difficult to insert the run-flat core into the inside of the tire when a larger sound absorbing member exists on the outer periphery of the circular shell. On the other hand, when the sound absorbing member is in a state of having a volume reduced by a film, the sound absorbing member does not hinder the operations for integrating the run-flat core with the tire/wheel assembly, even in a case where a larger sound absorbing member is used.

BEST MODE FOR CARRYING OUT THE INVENTION

By referring to the attached drawings, detailed descriptions will be provided below for configurations of the present invention.

Figure 1:
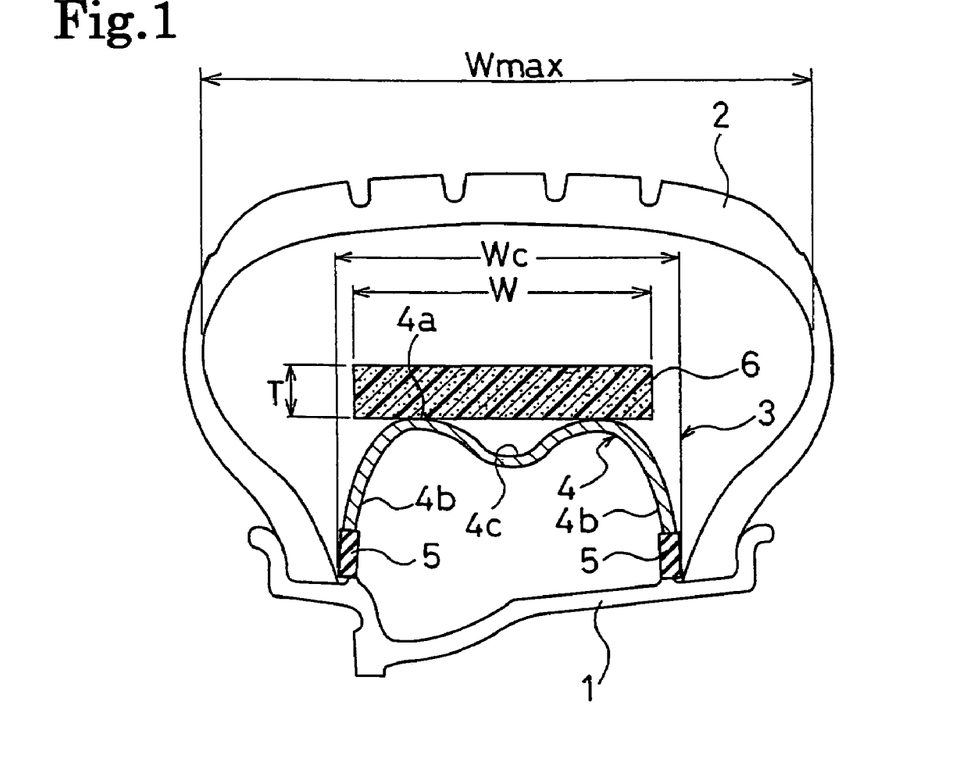
FIG. 1 is a meridional cross-sectional view illustrating a tire/wheel assembly configured according to a first embodiment of the present invention.
Figure 2:
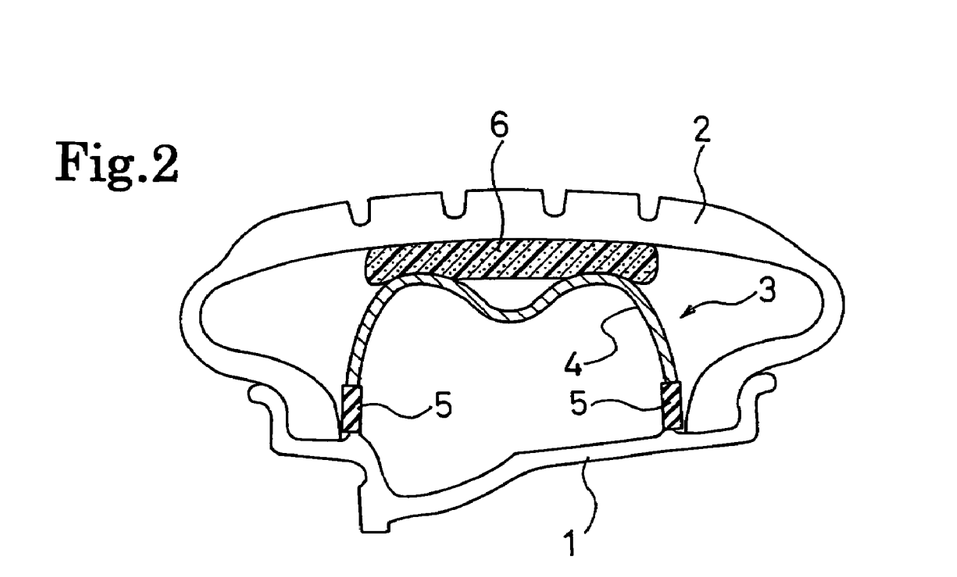
FIG. 2 is a meridional cross-sectional view illustrating conditions in which the tire/wheel assembly of FIG. 1 is during run-flat driving.

FIG. 1 illustrates a tire/wheel assembly configured by a first embodiment of the present invention. FIG. 2 illustrates the tire/wheel assembly during run-flat driving. In FIG. 1, reference numeral 1 denotes a rim of a wheel; 2, a pneumatic tire; and 3, a run-flat core. Each of the rim 1, the pneumatic tire 2 and the run-flat core 3 is formed to have a circular shape coaxially with the rotation axis of the wheel, the rotation axis not illustrated. Specifically, the run-flat core 3 is inserted into a cavity formed between the pneumatic tire 2 and the rim 1 of the wheel.

The run-flat core 3 is configured of an annular shell 4 and elastic rings 5, all of which constitute a main part of the run-flat core 3. The run-flat core 3 is separate from the inner wall surface of the pneumatic tire 2 during normal driving. When the tire is punctured, the run-flat core 3 supports the underinflated tire 2 from the inside of the tire.

The circular shell 4 has a continuous supporting surface 4a expanding toward the outer periphery (radially outward) for supporting the punctured tire, and forms an open leg structure in which leg portions 4b and 4b are provided along two sides of the supporting surface 4a. The supporting surface 4a of the circular shell 4 is formed to have, when viewed in the cross section profile orthogonal to the tire circumferential direction, curved convex surfaces each protruding toward the outer periphery of the supporting surface 2. At least two curved convex surfaces exist in the axial direction of the tire, and a concave portion 4c is formed between the curved convex surfaces. Since the supporting surface 4a of the circular shell 4 is formed to have at least two neighboring curved convex surfaces as described, the supporting surface 4a has at least two separated portions each contacting with the inner wall surface of the tire, and thus local friction caused on the inner wall surface of the tire can be reduced. Consequently, distance of continuous traveling during run-flat traveling can be longer.

The above-described circular shell 4 is composed of a rigid material in order to support the weight of a vehicle through the punctured pneumatic tire 2. Metal, resin or the like is used as a component of the circular shell 4. Steel, aluminum and the like can be taken as examples of metal. As for resin, any of thermoplastic resin and thermosetting resin may be used. Nylon, polyester, polyethylene, polypropylen, polystyrene, polyphenylene sulfide, ABS and the like can be taken as examples of thermoplastic resin, epoxy resin, unsaturated polyester resin and the like can be taken as examples of thermosetting resin. A resin may be used alone, and alternatively, reinforcing fibers may be added to resin to be used as fiber reinforcing resin.

The elastic rings 5 are attached respectively to the leg portions 4b, 4b of the circular shell 4 so as to support the circular shell 4 while abutting on a region from a bead sheet portion to a hump portion of the rim 1 along the bead portion of the pneumatic tire 2. The elastic rings 5 mitigates shocks and vibrations which the circular shell 4 receives from the punctuated pneumatic tire 2, as well as prevents the circular shell 4 from slipping on the rim 1, and stably supports the circular shell 4.

As components of the elastic rings 5, rubber or resin can be used. Especially, rubber is preferably used. As rubber, a natural rubber, an isoprene rubber (IR), a styrene butadiene rubber (SBR), a butadiene rubber (BR), a hydrogenated NBR, a hydrogenated SBR, an ethylene-propylene rubber (EPDM, EPM), a butyl rubber (IIR), an acrylic rubber (ACM), a chloroprene rubber (CR), a silicon rubber, a fluororubber and the like can be taken as examples. It goes without saying that such rubber may be appropriately mixed with additives such as a caulk, a vulcanizer, a vulcanization accelerator, a softener, and an antioxidant. Depending on the composition of the rubber compound, a desired elasticity of rubber can be obtained.

In the above-described tire/wheel assembly, a sound absorbing member 6 is provided around the entire outer periphery of the circular shell 4 constituting the run-flat core 3. The sound absorbing member 6 may be attached to the outer peripheral surface of the circular shell 4, or may fit to the outer peripheral surface of the circular shell 4 based on the elasticity thereof.

As illustrated in FIG. 2, in the tire/wheel assembly configured as described, when the pneumatic tire 2 is in the state of being punctured while the vehicle travels, the underinflated pneumatic tire 2 is supported by the circular shell 4 of the run-flat core 3, thereby run-flat traveling is made possible. In addition, since the sound absorbing member 6 is provided to the circular shell 4 of the run-flat core 3, cavity resonance during normal traveling can be reduced even in a case where the run-flat core 3 including the circular shell 4 is provided to the tire/wheel assembly.

As a component of the sound absorbing member 6, a porous material having the following properties is preferably used. The porous material has a tear strength (JIS K6301) of not less than 4.5 N/cm, preferably 4.5 N/cm to 30 N/cm, and has a sound absorption coefficient (JIS A1405) of not less than 5%, preferably 10% to 90%, at 200 Hz. The component imparts not only a sound absorbing function but also a buffer function to the sound absorbing member 6, thereby improving durability during run-flat traveling. When the sound absorbing member 6 has a tear strength of less than 4.5 N/cm, the effect of improving the durability during run-flat traveling is insufficient. In addition, when the sound absorbing member 6 has a sound absorption coefficient of less than 5% at 200 Hz, a sound absorbing effect at the frequency is insufficient. Polyurethane foam having a density of 5 kg/m$^3$ to 70 kg/m$^3$ can be taken as examples of the sound absorbing member 6.

The value of the width W of the sound absorbing member 6 is preferably not smaller than 30% of the value of the width Wc of the run-flat core, and is not larger than the value of the maximum width Wmax of the cavity. When the value of the width W is smaller than 30% of the value of the width Wc of the run-flat core, the effect of reducing the cavity resonance is insufficient. In addition, the thickness T of the sound absorbing member 6 in the radial direction of the tire is preferably 10 mm to 100 mm. When the thickness T is smaller than 10 mm, the effect of reducing the cavity resonance is insufficient. On the other hand, when the thickness T is larger than 100 mm, operations for assembling the run-flat core are hindered.

Figure 3:
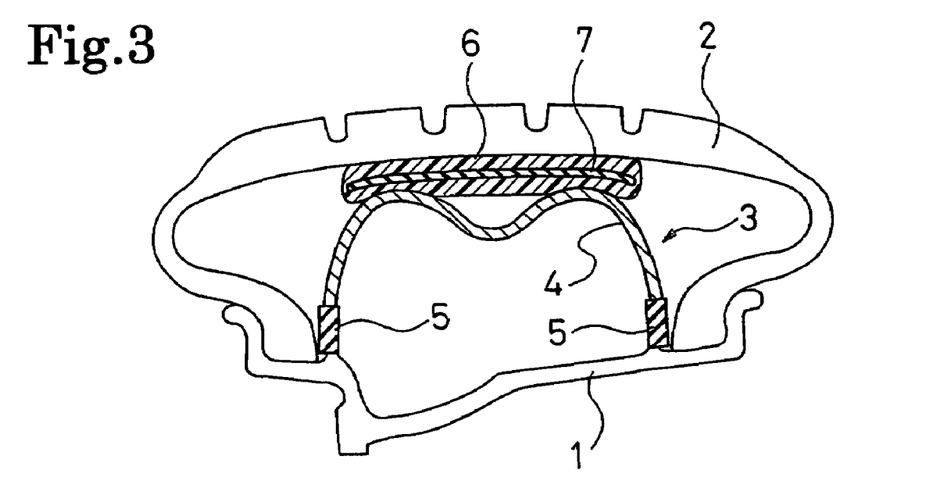
FIG. 3 is a meridional cross-sectional view illustrating a tire/wheel assembly configured according to a second embodiment of the present invention.

FIG. 3 illustrates a tire/wheel assembly configured by a second embodiment during run-flat driving. In the embodiment, as illustrated in FIG. 3, the sound absorbing member 6 is provided with a lubricant layer 7 impregnated with a lubricant. The lubricant exudes from the absorbing member 6 during run-flat driving, and thus reduces friction between a run-flat core 3 and the sound absorbing member 6 or friction between the sound absorbing member 6 and the tire 2, thereby improving durability during run-flat driving. As a way of holding the lubricant, the lubricant layer 7 impregnated with the lubricant may be provided to the inside of the sound absorbing member 6. Alternatively, the entire sound absorbing member 6 may be absorbed with the lubricant.

Figure 4:
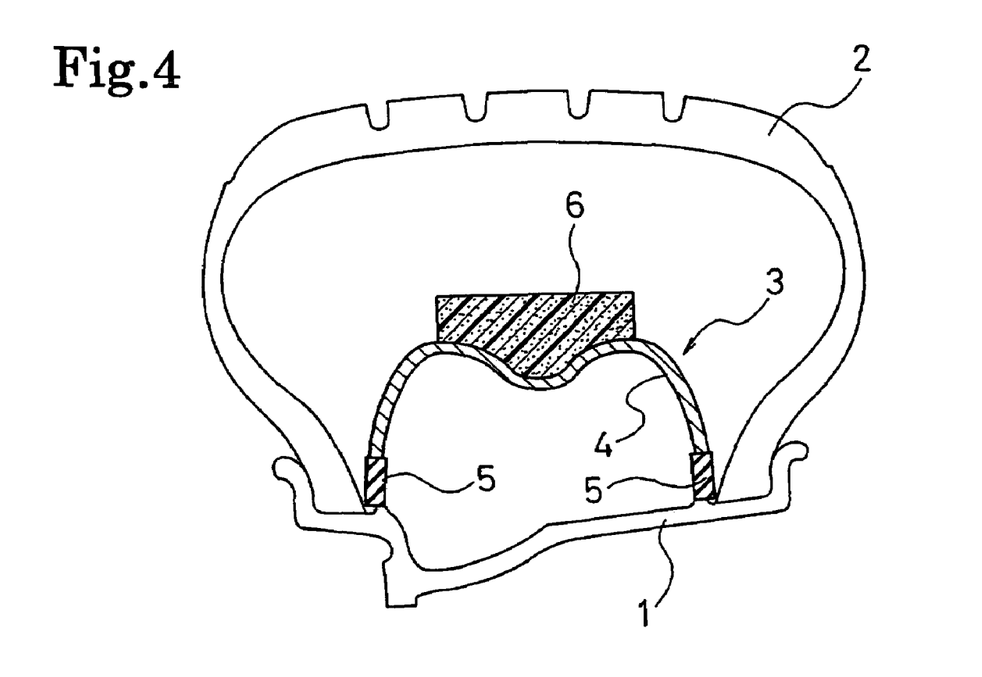
FIG. 4 is a meridional cross-sectional view illustrating a tire/wheel assembly configured according to a third embodiment of the present invention.
Figure 5:
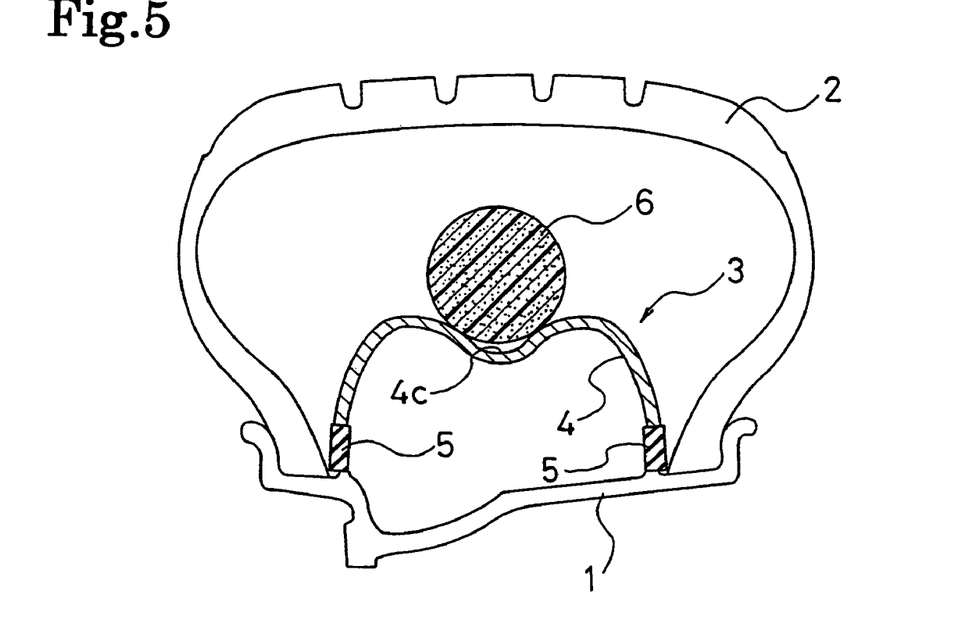
FIG. 5 is a meridional cross-sectional view illustrating a tire/wheel assembly configured by a fourth embodiment of the present invention.
Figure 6:
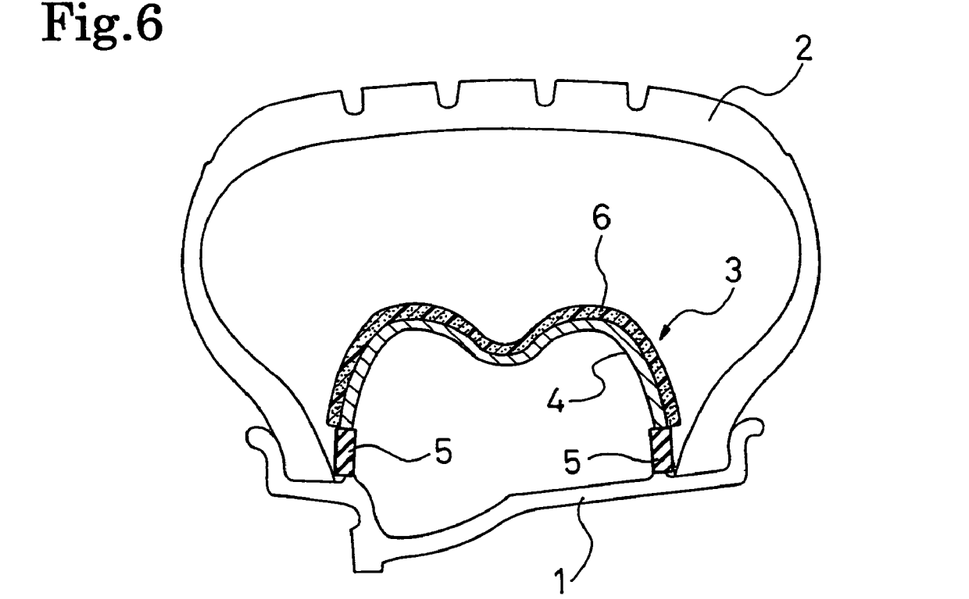
FIG. 6 is a meridional cross-sectional view illustrating a tire/wheel assembly configured according to a fifth embodiment of the present invention.
Figure 7:
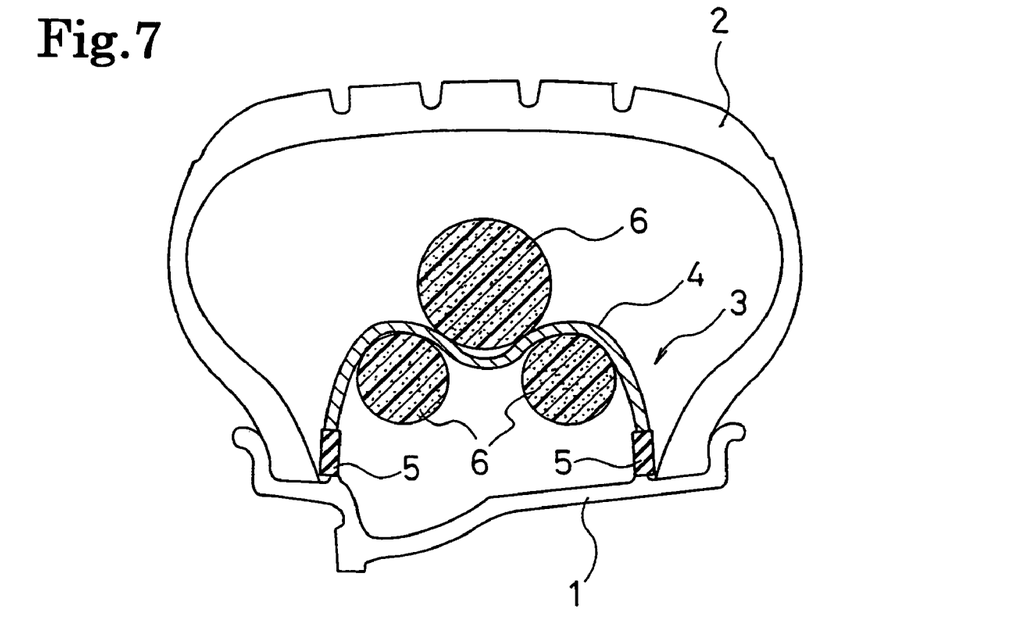
FIG. 7 is a meridional cross-sectional view illustrating a tire/wheel assembly configured according to a sixth embodiment of the present invention.
Figure 8:
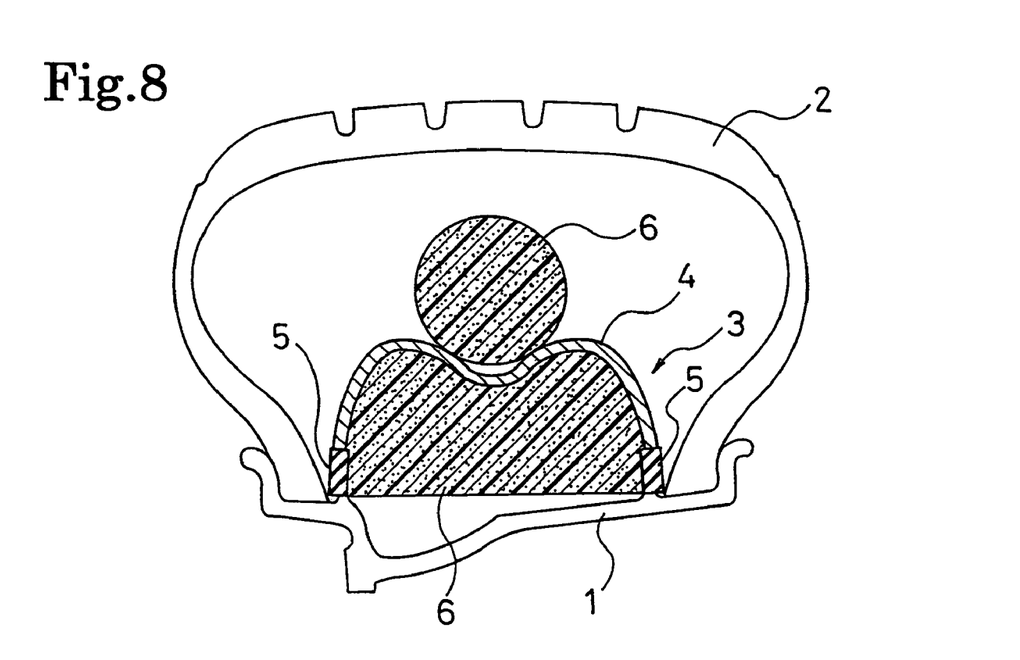
FIG. 8 is a meridional cross-sectional view illustrating a tire/wheel assembly configured according to a seventh embodiment of the present invention.

FIGS. 4 to 8 illustrates respectively tire/wheel assemblies configured according to the respective other embodiments of the present invention. As illustrated in FIGS. 4 to 8, shapes of a sound absorbing member 6 can be appropriately selected. In the embodiment of FIG. 4, the shape of the inner peripheral surface of the sound absorbing member 6 conforms to that of the outer peripheral surface of the circular shell 4. In the embodiment of FIG. 5, the cross sectional shape of a sound absorbing member 6 is circular, and thus the sound absorbing member 6 fits into a convex portion 4c of the circular shell 4. In the embodiment of FIG. 6, a sound absorbing member 6 is a sheet. In each of the embodiments of FIGS. 7 and 8, sound absorbing members 6 are provided respectively not only to the outer periphery, but also to the inner periphery, of the circular shell 4.

Figure 9:
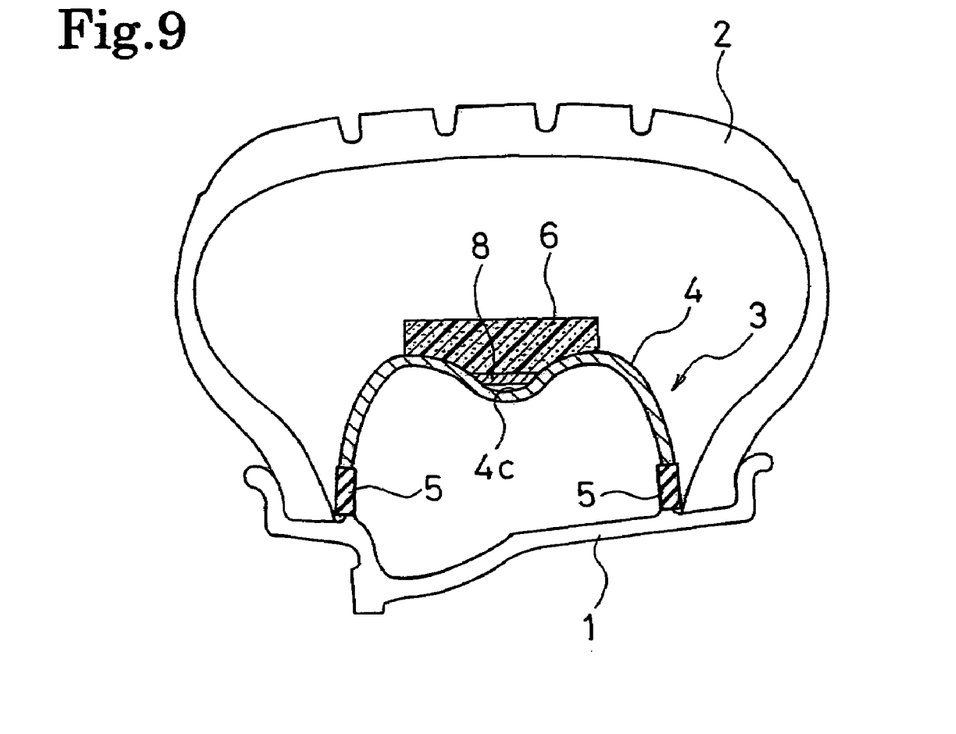
FIG. 9 is a meridional cross-sectional view illustrating a tire/wheel assembly configured according to an eighth embodiment of the present invention.
Figure 10:
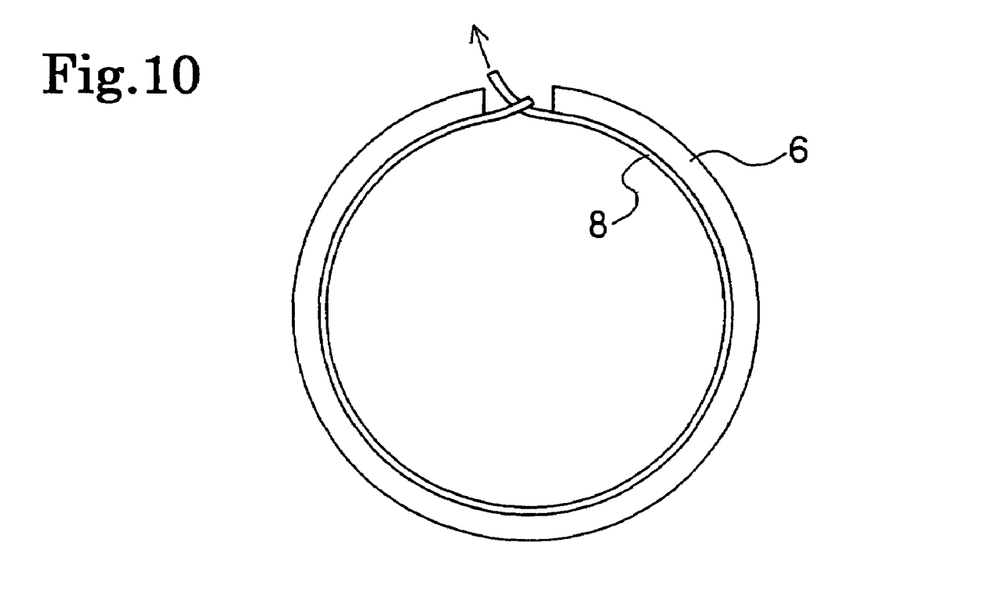
FIG. 10 is a side view illustrating a band to which a sound absorbing member is attached.

FIG. 9 illustrates a tire/wheel assembly of still an eighth embodiment of the present invention. FIG. 10 illustrates a band to which a sound absorbing member 6 is attached. In the present embodiment, a band 8 (refer to FIG. 10), to which a belt-shaped sound absorbing member 6 is attached, is used. As shown in FIG. 9, the sound absorbing member 6 is provided to the outer peripheral of the circular shell 4 by winding the band 8, to which the belt-shaped sound absorbing member 6 is attached, around the circular shell 4, and thus by clamping the band 8. Since the width of the band 8 is narrower than that of the concave portion 4c of the circular shell 4, the sound absorbing member 6 can be firmly fixed to the outer periphery of the circular shell 4 by only clamping the band 8 around the circular shell 4. The configuration allows processing costs to be lower than costs entailed in a case of directly attaching the sound absorbing member 6 to the circular shell 4 having a complicated shape. The band 8 including the sound absorbing member 6 is flexible for circular shells each with a different size.

Figure 11A:
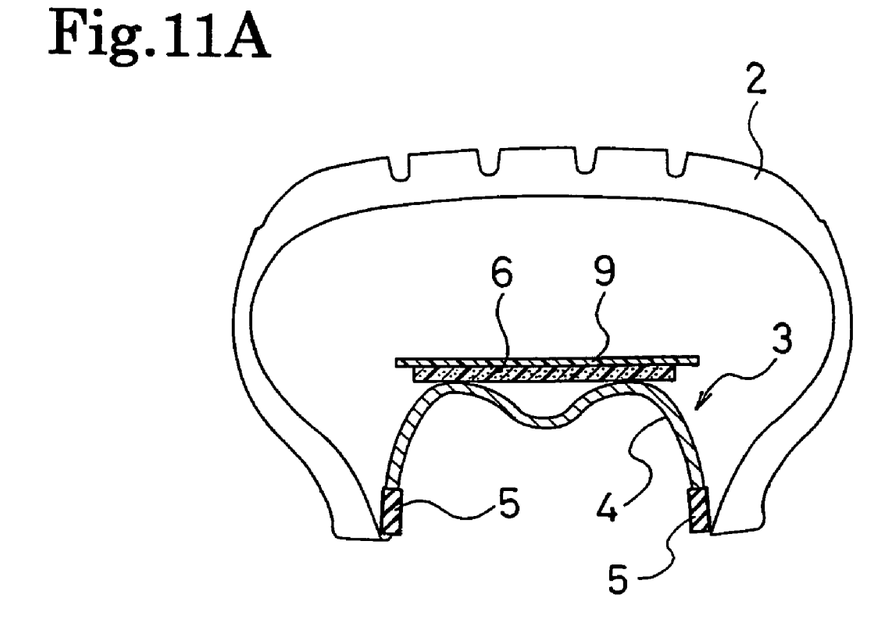
FIGS. 11A and 11B illustrate a tire/wheel assembly (wheel is not illustrated) configured according to a ninth embodiment, and are meridional cross-sectional views illustrating respectively steps for integrating a run-flat core with the tire/wheel assembly.
Figure 11B:
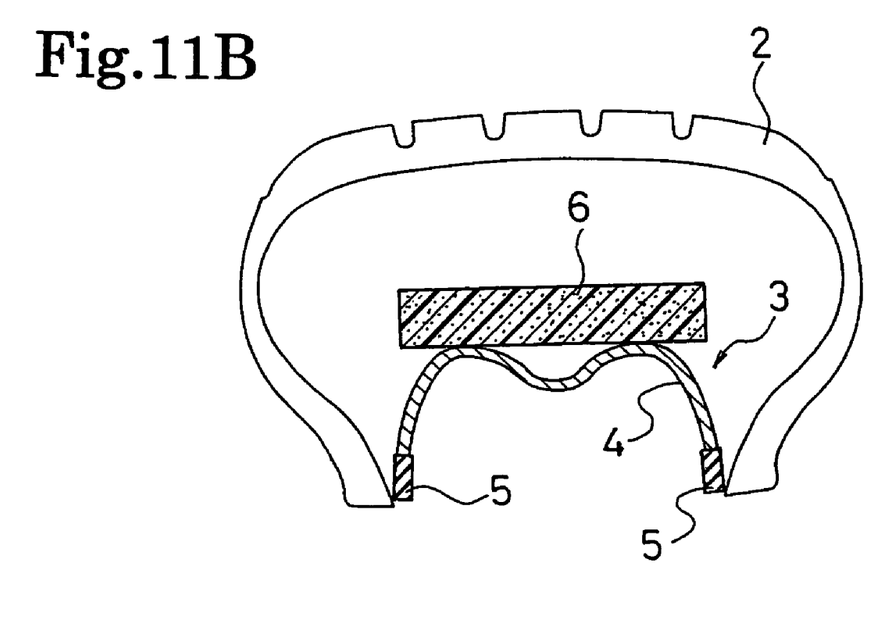

Each of FIGS. 11A and 11B illustrates a tire/wheel assembly of a ninth embodiment of the present invention. FIGS. 11A and 11B illustrate the respective steps of integrating a run-flat core with a tire/wheel assembly. As shown in FIG. 11A, a run-flat core 3 includes a sound absorbing member 6 in the outer periphery of the circular shell 4. In a condition before the run-flat core 3 is housed inside the pneumatic tire 2, the sound absorbing member 6 is covered with a film 9, and thus has a reduced volume. Accordingly, even when the larger sound absorbing member 6 is used, the sound absorbing member 6 does not hinder integrating operations for inserting the run-flat core 3 into the inside of the pneumatic tire 2. Thereafter, the film 9 is removed after the run-flat tire 3 is housed inside the tire 2, and accordingly the sound absorbing member 6 can be swelled to have the original size as shown in FIG. 11B.

Figure 12A:
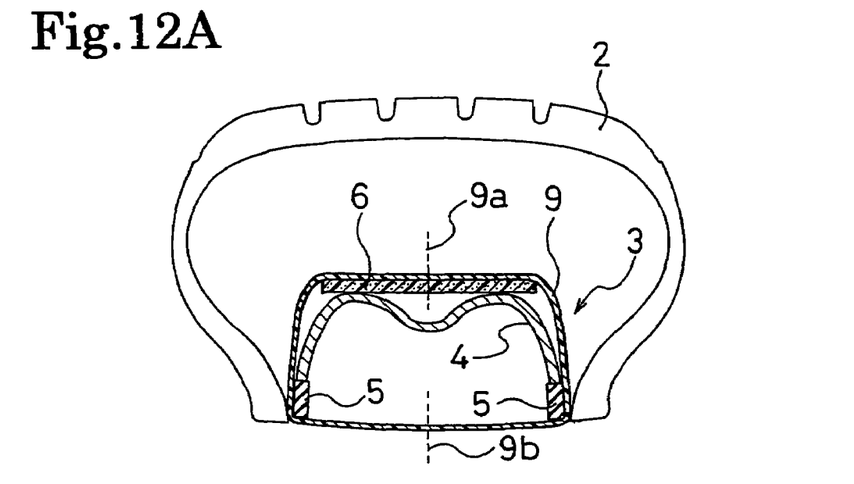
FIGS. 12A to 12C illustrate a tire/wheel assembly (wheel is not illustrated) configured according to a tenth embodiment, and are meridional cross-sectional views illustrating respectively steps for integrating a run-flat core with the tire/wheel assembly.
Figure 12B:
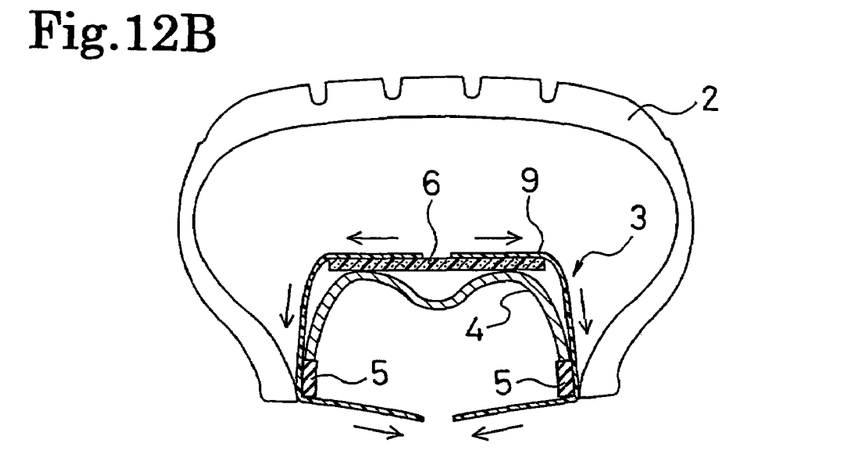
Figure 12C:
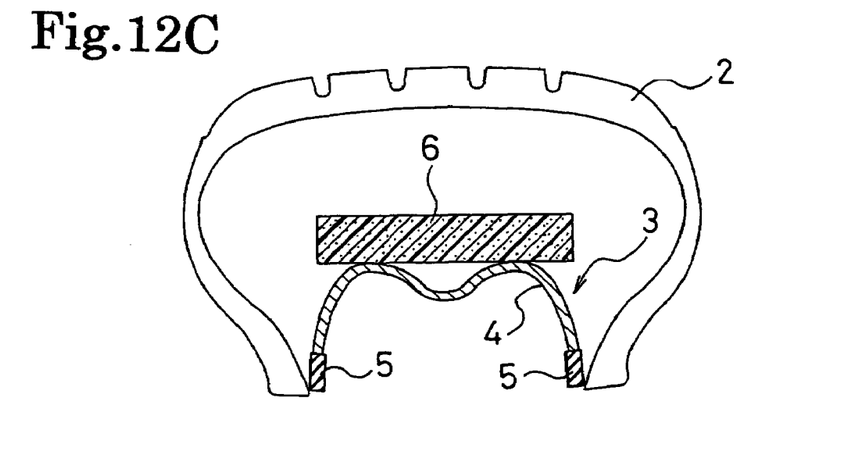

Each of FIGS. 12A to 12C illustrates a tire/wheel assembly configured according to a tenth embodiment of the present invention. FIGS. 12A to 12C illustrate the respective steps of integrating a run-flat core with a tire/wheel assembly. As illustrated in FIG. 12A, a run-flat core 3 includes a sound absorbing member 6 on the outer periphery of a circular shell 4. In a condition before the run-flat core 3 is housed inside the pneumatic tire 2, the sound absorbing member 6 is covered with a film 9 which can be separated into parts, and thus has a reduced volume. The film 9 has a toroidal shape, thus covers the entire run-flat core 3. The film 9 includes a large number of slits located along the circumferential directions, in various positions of the slit positions 9a and 9b of the respective outer periphery and the inner periphery of the film 9.

In this embodiment, even when the larger sound absorbing member 6 is used, the sound absorbing member 6 does not hinder integrating operations for inserting the run-flat core 3 into the inside of the pneumatic tire 2. As shown in FIG. 12B, after the run-flat core 3 is housed in the pneumatic tire 2, the film 9 is separated at the slit positions 9a and 9b into pieces by being pulled. Thereafter, the film 9 is removed, and thus the sound absorbing member 6 can be swelled to have the original size as illustrated in FIG. 12C.

Figure 13A:
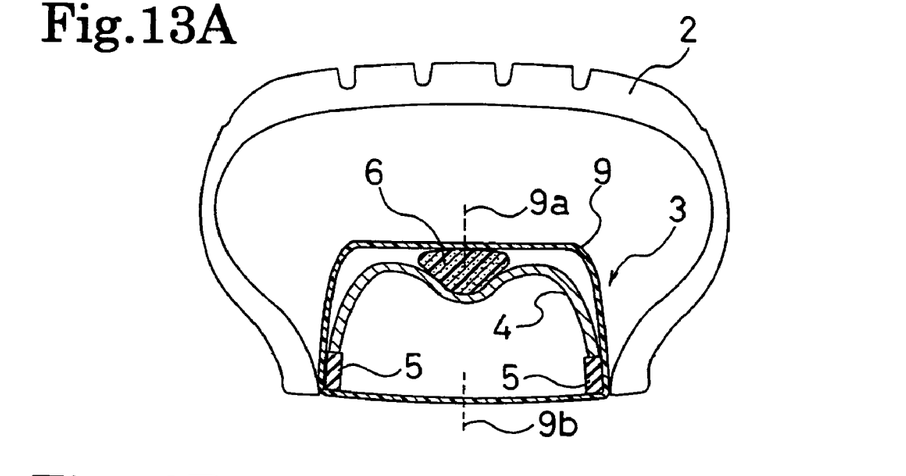
FIGS. 13A and 13C illustrate a tire/wheel assembly (wheel is not illustrated) configured according to an eleventh embodiment, and are meridional cross-sectional views illustrating respectively steps for integrating a run-flat core with the tire/wheel assembly.
Figure 13B:
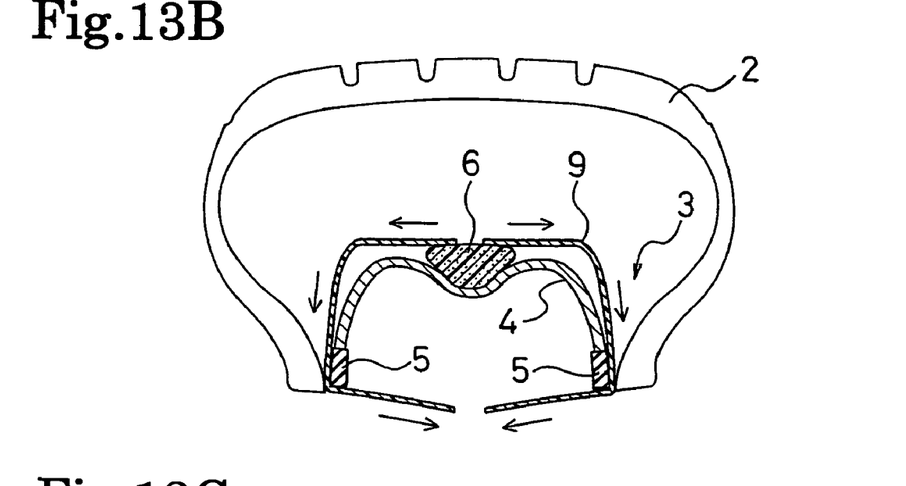
Figure 13C:
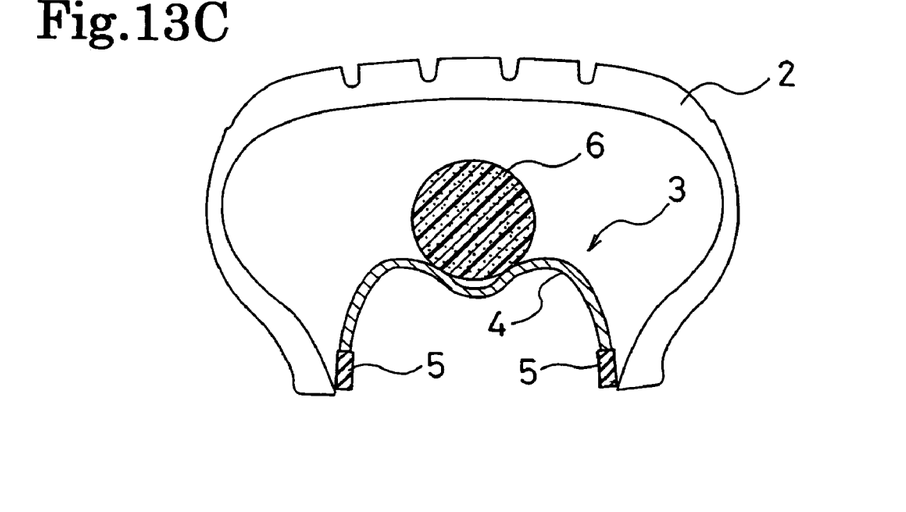

Each of FIGS. 13A to 13C illustrates a tire/wheel assembly of an eleventh embodiment of the present invention. FIGS. 13A to 13C illustrate the respective steps of integrating a run-flat core with a tire/wheel assembly. The embodiment provides substantially the same configuration as that of the embodiment of FIG. 12 except for the point that, in this embodiment, the shape of the cross-section of the sound absorbing member is circular.

According to each of the above-described embodiments, even when a run-flat core is inserted into a cavity formed between a pneumatic tire and a rim of a wheel, cavity resonance can be reduced. Accordingly, it is made possible to make best use of advantages of the run-flat core configured of an elastic ring and a circular shell.

Detailed descriptions are provided above for preferred embodiments of the present invention. It should be understood that various modifications, substitutions and replacements can be made within the spirit and the scope of the invention defined by the attached claims.

EXAMPLES

Tire/wheel assemblies (Examples 1 and 2) each including a pneumatic tire having a size of 215/55R16 and a wheel having a rim with a size of 16×7JJ were prepared. In each of the tire/wheel assemblies, a run-flat core configured of a pair of elastic rings and a circular shell was inserted into a cavity formed between the pneumatic tire and the rim of the wheel. A sound absorbing member was provided to the circular shell of the run-flat core. In addition, for comparison, a tire/wheel assembly (Conventional Example), in which no sound absorbing member was provided to a circular shell of a run-flat core, was prepared.

In Example 1, as the sound absorbing member, polyurethane foam, which has a tear strength (JIS K6301) of 4.5 N/cm and a sound absorption coefficient (JIS A1405) of 18% at 200 Hz, was used. In Example 2, as the sound absorbing member, polyurethane foam, which has a tear strength (JIS K6301) of 5.5 N/cm and a sound absorption coefficient (JIS A1405) of 12% at 200 Hz, was used. The polyurethane foam in each of Examples had a cross-sectional size of 100 mm×20 mm, and was provided to the entire outer periphery of the circular shell.

With respect to each of the above-described three types of the tire/wheel assemblies, durability during run-flat traveling was evaluated, and a peak sound pressure level of cavity resonance during normal traveling was measured. The results of the evaluation and the measurement were shown in Table 1.

[Durability During Run-flat Traveling]

A tire/wheel assembly to be examined was installed in a drive wheel of a FR (Front engine Rear drive) vehicle with a cylinder capacity of 2000 cc, and the inflation pressure of the tire was set to 0 kPa. Thereafter, the vehicle was driven at a speed of 90 km/h to the point where the vehicle could not be driven anymore, and then the total driving distance was measured. The results of evaluation on the tires are indicated with indices, using the result of the conventional example as 100. A larger index value indicates more durability during run-flat traveling.

[Peak Sound Pressure Level of Cavity Resonance During Normal Traveling]

A tire/wheel assembly to be examined was mounted on a FR (Front engine Rear drive) vehicle with the cylinder capacity of 2000 cc, and the inflation pressure of the tire was set to 210 kPa. Thereafter, an average of sound pressure level of a frequency of cavity resonance at a time when the vehicle was driven at a speed of 60 km/h was measured. Evaluation results are indicated by using the value obtained from the result of the conventional example as a standard value, and are indicated by use of the difference of values (dB) between the standard value and the value of a result of each of the Examples 1 and 2. The difference smaller than zero indicates that the cavity resonance is smaller than that of the standard value.

TABLE 1

| | Conventional Example | Example 1 | Example 2 |
|---|---|---|---|
| Durability during run-flat traveling (Index) | 100 | 100 | 108 |
| Peak sound pressure level of cavity resonance (dB) | Standard | −1.4 | −3.3 |

As shown in Table 1, cavity resonance during normal traveling was reduced in the case of each of the tire/wheel assemblies of the Examples 1 and 2. Especially, in Example 2, where polyurethane foam, which has a tear strength of 5.5 N/cm and a sound absorption coefficient of 25% at 200 Hz, was used as the sound absorbing member, durability during run-flat traveling was improved compared with that of the conventional example.

What is claimed is:

1. A tire/wheel assembly in which a run-flat core is inserted into a cavity formed between a pneumatic tire and a rim of a wheel, the run-flat core including a pair of elastic rings which are disposed on the rim respectively along bead portions of the pneumatic tire, and a circular shell which stretches between the elastic rings and extends in the tire circumferential direction, wherein a sound absorbing member is provided to the circular shell,
   wherein, for the purpose of providing the sound absorbing member to the circular shell, a band, to which the sound absorbing member is attached, is wound around the circular shell, and thus the band is clamped to the circular shell.

2. The tire/wheel assembly according to claim 1, wherein a porous material having a tear strength of not less than 4.5 N/cm and a sound absorption coefficient of not less than 5% at 200 Hz is used as the sound absorbing member.

3. The tire/wheel assembly according to any one of claims 1 to 2, wherein the sound absorbing member is impregnated with a lubricant.

4. The tire/wheel assembly according to any one of claims 1 to 2, wherein:
   the sound absorbing member provided to the circular shell is covered with a film so that the sound absorbing member is in a state of having a reduced volume; and
   the film is removed after the run-flat core is housed inside the pneumatic tire.

5. The tire/wheel assembly according to any one of claims 1 to 2, wherein:
   a width of the sound absorbing member is not smaller than 30% of a width of the run-flat core, and is not larger than the maximum width of the cavity; and
   a thickness of the sound absorbing member in the tire radial direction is 10 mm to 100 mm.

6. A run-flat core which is inserted into a cavity formed between a pneumatic tire and a rim of a wheel, the run-flat core including a pair of elastic rings disposed on the rim respectively along bead portions of the pneumatic tire, a circular shell which stretches between the elastic rings and extends in the tire circumferential direction, a sound absorbing member that is provided to the circular shell, and a band
   wherein, for the purpose of providing the sound absorbing member to the circular shell, the band, to which the sound absorbing member is attached, is wound around the circular shell, and thus the band is clamped to the circular shell.

7. The run-flat core according to claim 6, wherein a porous material having a tear strength of not less than 4.5 N/cm and a sound absorption coefficient of not less than 5% at 200 Hz is used as the sound absorbing member.

8. The run-flat core according to any one of claims 6 to 7, wherein the sound absorbing member is impregnated with a lubricant.

9. The run-flat core according to any one of claims 6 to 7, further comprising a film that covers the sound absorbing member, wherein the sound absorbing member provided to the circular shell is covered with the film so that the sound absorbing member is in a state of having a reduced volume.

10. The run-flat core according to any one of claims 6 to 7, wherein:
    a width of the sound absorbing member is not smaller than 30% of a width of the run-flat core, and is not larger than the maximum width of the cavity; and
    a thickness of the sound absorbing member in the tire radial direction is 10 mm to 100 mm.

* * * * *